United States Patent [19]

Beltran

[11] Patent Number: 4,577,656

[45] Date of Patent: Mar. 25, 1986

[54] VALVE

[76] Inventor: Jose M. F. Beltran, No. 10 - 12 Doctor Fleming Street, Bonrepos (Valencia), Spain

[21] Appl. No.: 620,199

[22] Filed: Jun. 13, 1984

[51] Int. Cl.$^4$ .............................................. F16L 7/00
[52] U.S. Cl. ..................................... 137/375; 251/310
[58] Field of Search ................. 251/309, 310; 137/375

[56] References Cited

U.S. PATENT DOCUMENTS

| 2,164,320 | 7/1939 | Groeniger | 251/310 |
| 2,256,416 | 9/1941 | Stockstill | 251/310 |
| 2,766,962 | 10/1956 | Fodor et al. | 251/310 |
| 3,298,396 | 1/1967 | Gressman et al. | 251/310 |
| 3,971,402 | 7/1976 | Gallo | 251/309 |
| 4,270,732 | 6/1981 | Redman | 251/310 |
| 4,275,868 | 6/1981 | Crone | 251/310 |

Primary Examiner—A. Michael Chambers
Assistant Examiner—Sheri M. Novack
Attorney, Agent, or Firm—Flynn, Thiel, Boutell & Tanis

[57] ABSTRACT

A valve assembly having a tubular valve body defining therein a main supply passage, which tubular valve body has an inlet opening at one end thereof, and an outlet opening adjacent the other end thereof in perpendicular relationship to the main supply passage. A sleevelike socket member is seated within the main supply passage in the vicinity of the outlet opening. The sleeve member has a communication opening through the sidewall thereof in alignment with the outlet opening, which communication opening confines therein an elastomeric seal ring for sealingly engaging the interior wall of the tubular body around the outlet opening. A shaftlike valve member is rotatably seated within the sleeve member and has an L-shaped flow passage which extends axially from the upstream end and then outwardly through the cylindrical sidewall for alignment with the communication opening when the valve member is rotated into its open position. The valve member has a stub shaft projecting axially outwardly from the other end of the tubular body and is provided with an appropriate knob nonrotatably mounted thereon.

4 Claims, 7 Drawing Figures

VALVE

BACKGROUND OF THE INVENTION

This invention relates to an improved valve for controlling the flow of a fluid.

The improved valve of the present invention includes features which make it advantageous and practical with respect to other known valve structures which are presently being marketed for similar purposes. More specifically, the improved valve of this invention permits construction of the valve with a substantial reduction in cost through utilization of a minimum number of parts, which facilitates and simplifies the assembly of the valve, provides greater tightness and hence less possibility of leakage, and decreases the turbulence which normally develops in the liquid when passing through the valve.

The improved valve, as hereinafter described, includes a main flow-control shaft of a cylindrical construction having a flow-control opening passing therethrough. This cylindrical shaft has a square stub shaft which projects outwardly of the valve housing for mounting a hand wheel thereon for operation of the valve due to a rotary movement. The portion of the shaft disposed within the housing is appropriately rotatably seated within a cuplike socket member which is seated within the housing and creates the desired tightness and hence sealing of the shaft with respect to the housing to prevent leakage while enabling the rotary movement which permits valve opening and closing.

Other objects and purposes will be apparent to persons familiar with valves of this general type upon reading the following specification and inspecting the accompanying drawings.

Figure 1:
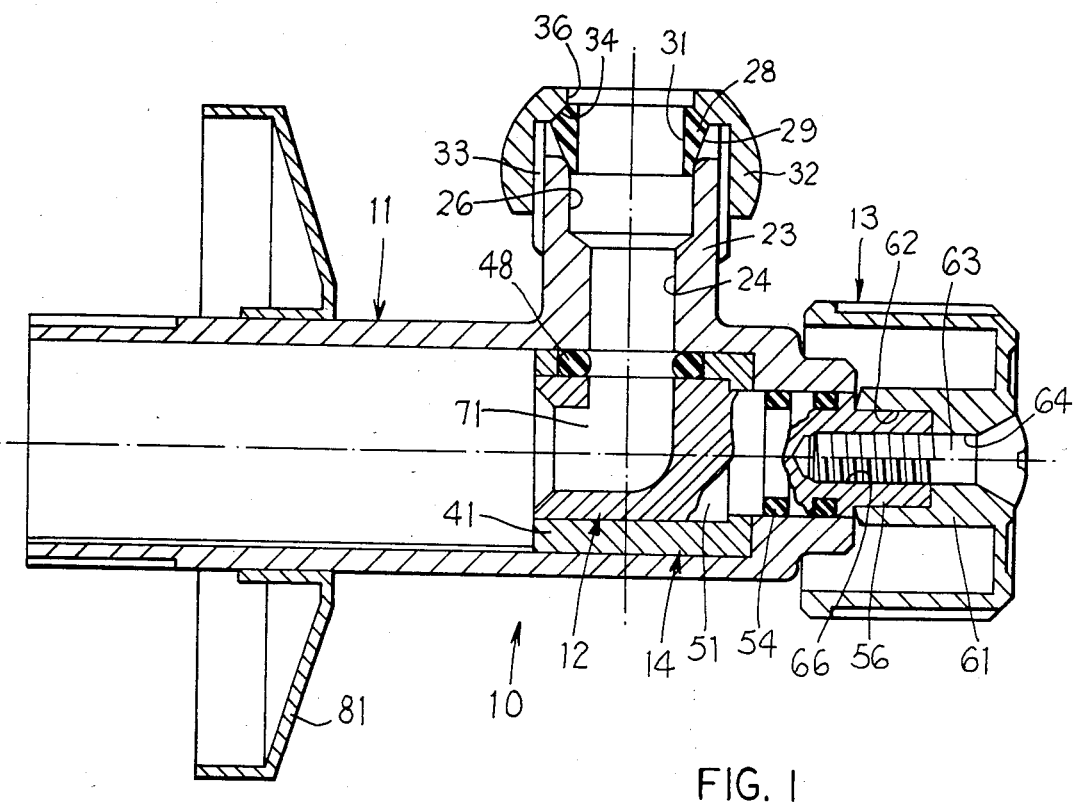
FIG. 1 is a longitudinal sectional view of the valve according to the present invention.

Certain terminology will be used in the following description for convenience in reference only and will not be limiting. For example, the words "upwardly" and "downwardly" will refer to directions in the drawings to which reference is made. The words "inwardly" and "outwardly" will refer to directions toward and away from, respectively, the geometric center of the valve and designated parts thereof. This terminology shall include the words specifically mentioned, derivatives thereof, and words of similar import.

DETAILED DESCRIPTION

Referring to FIG. 1, there is illustrated an improved valve assembly 10 according to the present invention. This valve assembly includes a valve body 11 having a valve member 12 rotatably disposed therein. A handle 13 is secured to the valve member 12 for controlling the rotation thereof between open and closed positions. The valve member 12 is rotatably seated within a socket 14 which is stationarily seated within the body member 11.

Figure 2:
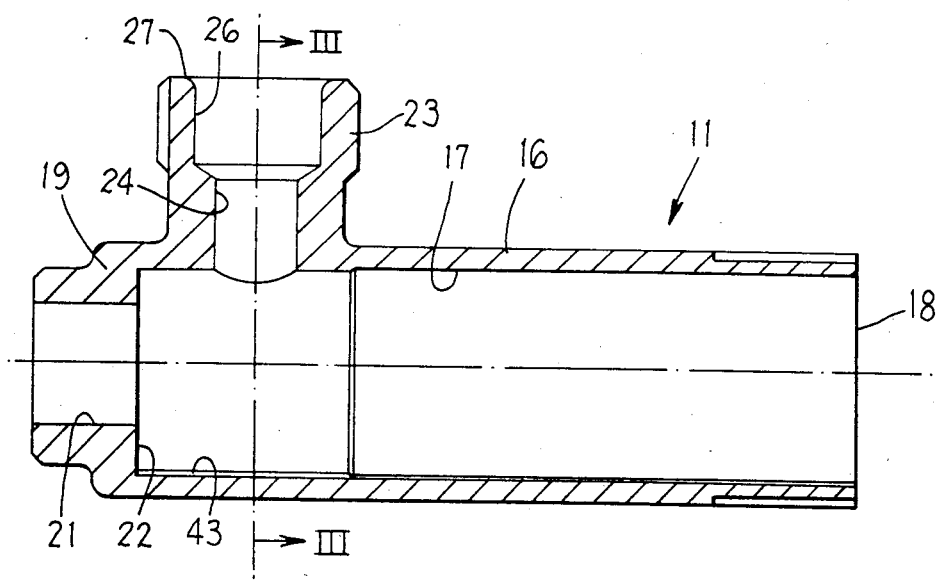
FIG. 2 is a sectional view of solely the valve body.
Figure 3:
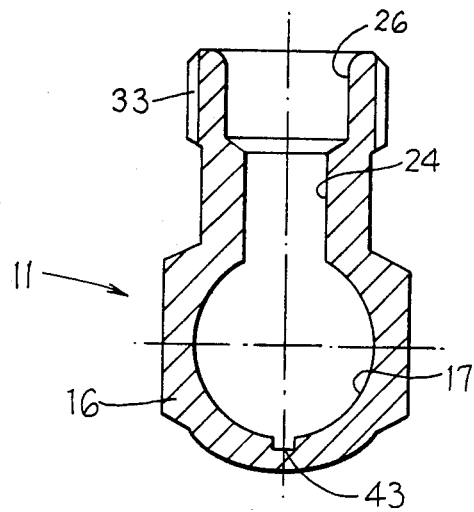
FIG. 3 is a sectional view along line III—III in FIG. 2.

Considering first the body member 11, and referring to FIGS. 2 and 3, same comprises an elongated tube 16 having a substantially cylindrical passage 17 extending longitudinally over a majority of the length of the tube. An inlet 18 is defined at one end of the passage 17. The tube 16 has an end wall 19 at the other end thereof, and a reduced-diameter cylindrical opening 21 extends through the end wall 19 in coaxial alignment with the passage 17 for communication with this latter passage. This end wall 19 defines an interior annular shoulder 22 thereon at the inner end of passage 17.

The valve body 11 also has a tubular stub shaft 23 which is fixed, here integrally, to the tube 16 and projects perpendicularly therefrom in the vicinity of the end wall 19. This stub shaft 23 has an outlet opening 24 extending therethrough, which opening 24 perpendicularly intersects and communicates with the passage 17 adjacent the inner end thereof. The outlet opening 24, at its outer end, terminates in an enlarged exit opening 26 provided with a rounded annular seat 27 adjacent its outer end.

To permit the exit opening to be suitably sealingly coupled to a further member, such as a small tube having its end projecting into and positioned within the exit opening 26, the tubular stub shaft 23 is provided with an adjustable sealing structure which includes an elastomeric seal ring 28 which is adapted to sealingly engage the stub shaft. This sealing ring 28 has an outer conical surface 29 which is designed to create a wedging and sealing engagement with the rounded annular seat 27 provided on the stub shaft. The seal ring 28 also has a substantially cylindrical internal sealing surface 31 which is adapted to be sealingly compressed against the outer wall of the tube which is positioned within the exit opening. This seal ring 28 is suitably sealingly compressed by a surrounding nut 32 which is appropriately coupled to the stub shaft, such as being threadably joined thereto by means of a threaded connection 33. This nut has an internal conical shoulder 34 which bears against a similar upper conical surface on the seal ring for axially compressing it into sealing engagement with the stub shaft. The nut also has an appropriate opening 36 extending coaxially therethrough for accommodating the exit tube. With this arrangement, a cylindrical discharge tube can have the end portion thereof inserted into the exit opening 26, whereupon the nut 32 can be rotated so as to effect tightening of the seal ring 28, thereby causing the latter to sealingly engage both the stub shaft 23 and the discharge tube.

The main valve body 11 also has the socket member 14 stationarily positioned within the inner end of the cylindrical passage 17. This socket member 14 is of a cuplike configuration and includes a cylindrical tubular sidewall 41 sized so as to snugly fit within the cylindrical passage 17. This tubular sidewall 41 has an elongated rib 42 which projects outwardly therefrom and extends axially therealong, which rib 42 is slidably accommodated within an elongated groove 43 which is formed axially along the inner wall of the tube 16. This rib 42 and its cooperation within the groove 43 enables the socket member to be axially slidably inserted into the tube 16 while preventing relative rotation therebetween. The socket member 14 is seated within the inner end of the passage 17 so as to effectively snugly bear against the shoulder 22.

A substantially cylindrical opening 44 is formed in and through a substantial extent of the axial length of the socket member, and a further coaxially aligned opening 46 of somewhat reduced diameter extends through the inner end thereof, which reduced opening 46 is of substantially the same diameter as the opening 21 formed in the end wall 19. The socket member 14, in the sidewall thereof diametrically opposite from the rib 42, is provided with an opening 47 which extends radially through the sidewall for alignment and communication with the outlet opening 24. However, the opening 47 is slightly larger than the outlet opening 24 so as to permit an annular elastomeric seal ring 48, such as an O-ring, to be positioned within the opening 47 to hence create a sealing engagement with the inner wall of the tube 16 in surrounding relationship to the outlet opening 24.

Figure 4:
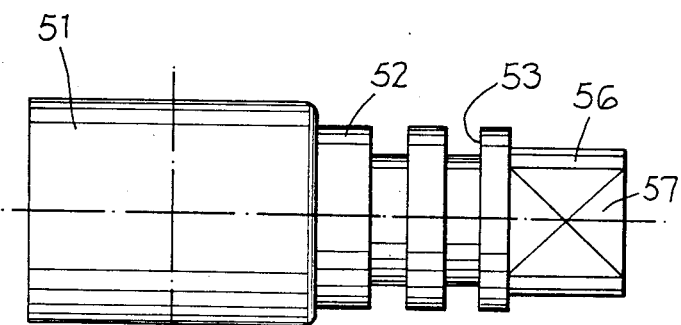
FIG. 4 is a side view of solely the rotary valve member.
Figure 5:
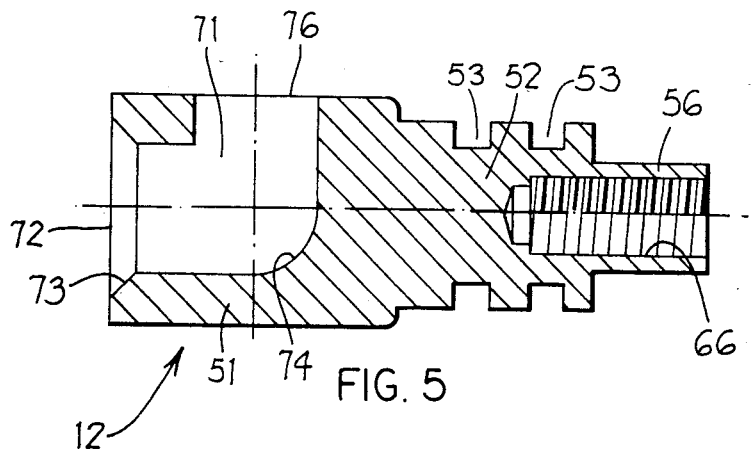
FIG. 5 is a longitudinal sectional view of the rotary valve member positioned substantially as illustrated in FIG. 1.
Figure 6:
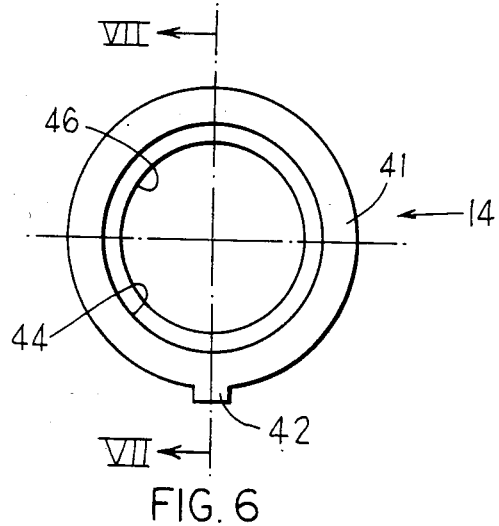
FIG. 6 is an end elevational view of the socket.
Figure 7:
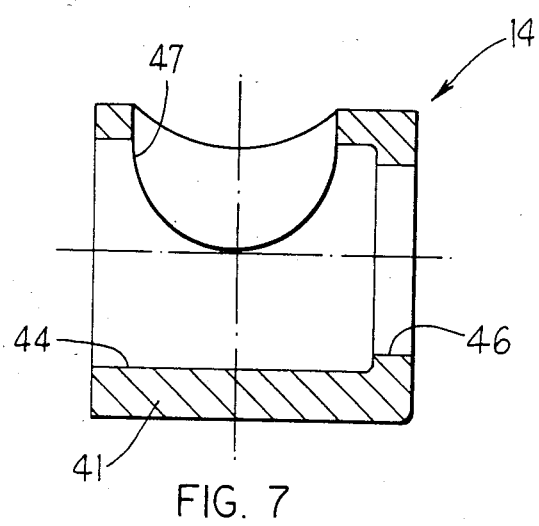
FIG. 7 is a sectional view taken substantially along line VII—VII in FIG. 6.

Considering now the rotary valve member 12, and referring specifically to FIGS. 1, 4 and 5, same includes a main cylindrical shaft portion 51 which has a diameter and an axial length so as to rotatably snugly fit within the opening 44 of the socket member 14. This main cylindrical shaft portion 51 is coaxially fixed, here integrally, to an intermediate cylindrical portion 52 which has a diameter substantially corresponding to that of the openings 46 and 21, whereupon this intermediate cylindrical shaft portion 52 is designed to project axially outwardly through the end wall 19. This intermediate portion 52 has a pair of surrounding annular grooves 53 formed therein, and appropriate elastomeric seal rings 54, such as O-rings, are disposed in these grooves to create a rotatable but sliding sealed engagement with the wall of the opening 21.

The intermediate cylindrical shaft portion 52 is in turn fixedly, here integrally, joined to an axially aligned shaft portion 56 which is of reduced diameter and defines the outer free end of the rotary valve member. This outer shaft portion 56 has a pair of flats 57 formed on diametrically opposite sides thereof so that this shaft portion hence resembles a square cross section.

The outer shaft portion 56, and the provision of the opposed flats 57 thereon, enables the rotary valve member to be nonrotatably coupled to the exterior handle or knob 13. The latter is formed substantially as a hand wheel having an appropriate outer surface which is suitably knurled or the like to permit gripping thereof. This hand wheel 13 also has a central hub 61 having an opening 62 in the inner end thereof which is sized to correspond to the cross section of the shaft portion 56 so as to telescope thereover and hence nonrotatably couple the hand wheel 13 to the rotary valve member 12. A locking connection such as a threaded screw 63 extends through an aligned opening 64 formed in the outer end of the hub, and thence threadably engages a threaded opening 66 which is formed coaxially in the outer end of the rotary valve member.

The rotary valve member, within the main cylindrical portion 51, is provided with an L-shaped flow passage 71 formed therein, which passage 71 includes a first leg terminating in an inlet opening 72 formed in the axial free end thereof for direct communication with the passage 17. This inlet opening is preferably provided with an enlarged conical transition surface 73 to facilitate the flow from the passage 17 into the passage 71. The inlet leg of this passage 71 merges through a smoothly curved right angle corner 74 with the outlet leg of the passage, which outlet leg terminates in an outlet opening 76 formed in the cylindrical peripheral sidewall of the main shaft portion 51. This outlet opening 76 has a diameter which substantially corresponds to the outlet opening 24 and is adapted to communicate therewith through the opening 47 formed in the socket member 14. The seal ring 48 is adapted to create a sealed engagement with the external wall of the shaft portion 51 in surrounding relationship to the outlet opening 76 when the valve member is in the open position substantially as illustrated by FIG. 1.

When closing of the valve is desired, the hand wheel 13 is manually gripped so as to effect rotation of the rotary valve member 12 within the socket 14 through a sufficient angular extent, such as by rotating the valve member through approximately 180°, thereby disrupting the communication between the passage 71 and the outlet opening 24. When in this closed position, the seal ring 48 sealingly isolates the outlet opening 24 from the passage 17.

The valve assembly can be provided with a suitable cover plate 81 associated with the tube 16 if desired.

The operation of the valve according to this invention is believed apparent from the description set forth above, so that further description thereof is believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A valve assembly, comprising:
  a valve body comprising a tubular portion having an interior wall defining therein a main supply passage extending coaxially thereof, said tubular portion having an inlet opening associated with one end thereof for communication with said supply passage, and means associated with said tubular portion adjacent the other end thereof for defining an outlet opening adapted for communication with said supply passage, said outlet opening extending through the sidewall of said tubular portion in substantially transverse relationship with respect to the longitudinal axis of said supply passage;
  valve means rotatably disposed within said tubular portion adajcent said other end thereof and movable between open and closed positions for controlling flow of fluid from said main supply passage to said outlet opening;
  a socketlike sleeve member snugly seated within said main supply passage adjacent said other end of said tubular portion, said socketlike sleeve member being nonrotatably coupled to said tubular portion and defining therein a central opening which is coaxially aligned with and communicating with said main supply passage, said sleeve member also having a communication opening formed radially through the sidewall thereof and disposed in axial alignment with said outlet opening, said communication opening being of larger diameter than said outlet opening;
  said valve means including a substantially cylindrical valve member snugly but rotatably positioned within the central opening of said sleeve member, said valve member having a substantially L-shaped flow passage extending therethrough, said L-shaped flow passage including an inlet which opens axially through an end face of said valve member for direct communication with main supply passage, said L-shaped flow passage including an outlet at its other end which is formed in the surrounding exterior cylindrical sidewall of said valve member, said outlet being of smaller diameter than said communication openng, and said outlet being radially aligned with the communication opening in said socketlike sleeve member when the valve member is rotatably moved onto its open position;

an elastomeric seal ring positioned within and extending around the radially outer portion of said communication opening and being compressively held between the interior wall of the tubular portion and the exterior cylindrical side wall of the rotary valve member for creating a first annular sealed arrangement with the interior wall of the tubular portion in surrounding relationship to the outlet opening and a second annular sealed engagement with the exterior cylindrical sidewall of said valve member, said seal ring sealingly engaging the exterior cylindrical sidewall in surrounding relationship to said outlet when said valve member is in its open position; and handle means positioned externally of said tubular portion adjacent said other end thereof and coaxially aligned with and nonrotatably fixed to said valve member for controlling rotation thereof between said open and closed positions.

2. A valve assembly according to claim 1, wherein said tubular portion adjacent said other end thereof is provided with an end wall having a reduced diameter opening extending therethrough in coaxial alignment with said main supply passage, said socketlike sleeve member being internally abutted against said end wall, and said valve means having a reduced-diameter stub shaft portion which is coaxially fixed to said cylindrical valve member and projects axially outwardly through said reduced-diameter opening, said stub shaft portion having annular elastomeric seal ring means mounted thereon for creating a slidable sealed engagement with said end wall, and said handle means including a manually engageable knob nonrotatably secured to the outer free end of said stub shaft portion.

3. A valve assembly according to claim 2, wherein the valve body includes a second tubular portion which is perpendicularly fixed to said first-mentioned tubular portion and defines said outlet opening extending therethrough.

4. A valve assembly according to claim 1, wherein the socketlike sleeve member has an axially elongated external rib which projects outwardly therefrom, and wherein the interior wall of said tubular portion defining said main supply passage has an axially elongated groove which opens inwardly from the inlet end, said groove slidably accommodating therein said rib to permit the socketlike sleeve member to be slidably inserted into the tubular portion and nonrotatably secured relative thereto.

* * * * *